(12) United States Patent
Harris (10) Patent No.: US 7,762,553 B2
(45) Date of Patent: Jul. 27, 2010

(54) FORM-FITTING ELECTRONIC GAME CONTROLLER COVER

(76) Inventor: Curtis J. Harris, 14701 Seneca Rd., Darnestown, MD (US) 20874-2621

( * ) Notice: Subject to any disclaimer, the term of this patent is extended or adjusted under 35 U.S.C. 154(b) by 126 days.

(21) Appl. No.: 11/891,827

(22) Filed: Aug. 13, 2007

(65) Prior Publication Data

US 2008/0122173 A1 May 29, 2008

Related U.S. Application Data

(60) Provisional application No. 60/867,186, filed on Nov. 25, 2006.

(51) Int. Cl.
*A63F 71/00* (2006.01)
(52) U.S. Cl. ...................... 273/148 B; 21/333
(58) Field of Classification Search ............. 273/148 B; 463/47; D21/333
See application file for complete search history.

(56) References Cited

U.S. PATENT DOCUMENTS

| | | | | |
|---|---|---|---|---|
| 5,365,570 A | * | 11/1994 | Boubelik | ..................... 455/565 |
| D396,495 S | * | 7/1998 | Hirokane | ................... D21/385 |
| 6,120,025 A | * | 9/2000 | Hughes, IV | .............. 273/148 B |
| 6,923,443 B1 | * | 8/2005 | Hughes, IV | .............. 273/148 B |
| D515,807 S | * | 2/2006 | Faillace | ........................ D3/218 |
| D521,567 S | * | 5/2006 | Svendsen et al. | ........... D21/333 |
| D534,962 S | * | 1/2007 | Svendsen et al. | ........... D21/333 |
| D570,854 S | * | 6/2008 | Harris | ........................ D14/454 |
| D578,167 S | * | 10/2008 | Harris | ........................ D21/333 |
| D587,717 S | * | 3/2009 | Harris | ........................ D14/454 |
| 2008/0122173 A1 | * | 5/2008 | Harris | ..................... 273/148 B |

FOREIGN PATENT DOCUMENTS

GB 2315206 A * 1/1998

* cited by examiner

*Primary Examiner*—Raleigh W. Chiu
(74) *Attorney, Agent, or Firm*—Ober / Kaler; Royal W. Craig (57) ABSTRACT

A cover for a video game controller for precision gaming therewith, the cover being formed as a holster defined by opposing lobes for seating the respective lobes of the controller, with a central strap joined integrally on one side of the holster and fastenable around it by opposing hook and loop fastening pads. The cover is defined by one or more stretch fabric insets to impart a degree of resiliency, thereby ensuring a taught form-fitting configuration. The cover fabric is a two-layer or three-layer sandwich with faux leather exterior and optional padding. The combination of the elastic inset(s) and adjustable fold-over strap afford a snug tailored fit for precision gaming with Xbox360™, Nintendo Wii™ and PlayStation 3™ controllers, among others, either cable or wireless versions.

16 Claims, 8 Drawing Sheets

FORM-FITTING ELECTRONIC GAME CONTROLLER COVER

CROSS-REFERENCE TO RELATED APPLICATIONS(S)

The present application derives priority from U.S. provisional application Ser. No. 60/867,186 filed Nov. 25, 2006.

BACKGROUND OF THE INVENTION

1. Field of the Invention

The invention relates accessories for electronic games and, more particularly, to a game controller cover having a trim, taut, skin-tight, form-fitting construction to improve the tactile feel of the game controller.

2. Description of Prior Art

Electronic game controllers for consoles such as Xbox360™, Nintendo Wii™ and PlayStation 3™ have evolved into high-precision devices that give true game enthusiasts the ergonomic and tactile feel that they demand. Indeed, slight nuances in "feel" can translate into significant performance gains and/or alleviate hand tension.

Most game controllers comprise a standardized two-lobed handheld configuration with a left-hand lobe, right-hand lobe, and central portion, all having an array of face-mounted controls. Despite this limited degree of uniformity, a wide variety of game controllers exist in a wide variety of configurations. For example, some are wired versus wireless, placement of controls can vary, and dimensions differ from model to model, etc.

There are currently a variety of controller covers offered as accessories to improve the ergonomic feel of the controller. These controller covers are most commonly simple fabric shells which fasten around the controller. In most cases the texture of the fabric improves tactile feel, and leather or faux leather materials are preferred for this purpose. However, many existing controllers are improperly tailored or have insufficient fasteners, and do not fit snugly. A loose fit can detract from precision gaming; hence a snug fit is very important. However, a snug fit is hard to accomplish without an elastic fabric given the numerous configurations of controllers available. For example, Xbox 360™ controllers differ from PlayStation 3™, and both of these brands offer both cable controllers and wireless. The variety of controllers makes standardization difficult. As a result manufacturers must produce different covers for the many different controller brands and models.

U.S. Pat. No. 6,120,025 to Hughes IV is illustrative of a controller cover adapting a two-lobed holster configuration. This patent suggests that the entire cover be formed with elastic properties such as rubber or neoprene such that the elasticity of the covering material will secure the covering material to the controller. However, rubber or neoprene fails to give the tactile advantages of a leather or faux suede vinyl material. The '025 patent also suggests attaching the cover via a central foldover strap that hooks around the central section of the controller. Unfortunately, the hook attachment leaves no room for adjustment.

Other examples of controller covers include U.S. Pat. No. 5,501,458 to Mallory which shows a padded cover for electronic game controllers with absorbent material (foam).

United States Patent Application 20050075172 to Coleman shows a cover for customizing and providing improved comfort and feel of a hand-held video game controller. The controller cover is a removable soft cover made of cloth, vinyl, leather, or the like. The cover is provided with padded material such as neoprene or other compressible foam in proximity to the game controller handles.

U.S. Design Pat. No. D545,317 to Wang et al. issued Jun. 26, 2007 shows an ornamental game controller enclosure with spots.

U.S. Design Pat. No. D521,567 to Svendsen et al. issued May 23, 2006 shows an ornamental cover for a game controller with opposing lobe-holsters and a central strap that clips over the main body of the controller.

What is desirable is a controller cover having a two-lobed holster configuration formed in a particular pattern from leather or faux suede/leather vinyl padded material with a singular or plurality of sewn-in elastic panels, and a central fold-over strap with an adjustable Velcro™ attachment. The combination of the elastic panels and adjustable fold-over strap afford a snug tailored fit for precision gaming with the Xbox360™, Nintendo Wii™ and PlayStation 3™ controllers, among others, either cable or wireless versions.

SUMMARY OF THE INVENTION

It is a primary object of this invention to provide a game controller cover having a trim and taut form-fitting construction to improve the tactile feel of the game controller.

It is another object to provide a game controller cover design that fits a wider range of controllers including the Xbox 360™, Nintendo Wii™ and PlayStation 3™ controllers, among others, either cable or wireless versions, thereby making standardization easier.

It is another object to provide a game controller cover design with a particular combination of elastic panels and an adjustable fold-over strap to ensure a snug tailored fit for precision gaming.

In accordance with the foregoing and other objects, the present invention is a cover for a video game controller of a type having a left-hand lobe, right-hand lobe, and central portion with opposing thumb controls. The controller cover is formed as a holster defined by opposing lobes for seating the respective lobes of the controller, with a central strap joined integrally on one side of the holster for attachment up, overtop, and to the other side. The strap attaches by opposing hook and loop fastening pads, one mounted on the distal backside of the strap and one on the backside of the holster. The strap is defined by a stretch fabric inset sewn along its length to impart a degree of lengthwise resiliency. In addition, one or more elastic inset(s) interrupt the backside of the holster. For example, the insets may be opposing gussets. The controller cover is affixed to the controller in a taught, form-fitting configuration by seating the controller in the holster and pulling the strap up and around back, pulling taught, and pushing the strap against the controller to secure the Velcro™.

The controller cover fabric is a three layer fabric sandwich including a super absorbent padded middle layer sandwiched between an inner fabric liner and an outer porous vinyl textured faux leather fabric. Alternatively, for a different effect the controller cover fabric may be a two-layer fabric sandwich including an outer soft suede-like material, and an inner vinyl layer having a high coefficient of friction that is designed to stick to the controller plastic. When the inner layer has the property of adhering or sticking to the controller surface it increases the controller cover's skintight effect.

The combination of the elastic insets and adjustable fold-over strap afford a snug tailored fit for precision gaming with Xbox360™, Nintendo Wii™ and PlayStation 3™ controllers, among others, either cable or wireless versions.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a video game controller cover formed in a particular pattern from leather, cloth, faux suede leather vinyl padded material in a two-lobed holster configuration with a singular or plurality of sewn-in elastic insets, and a central fold-over strap with an adjustable Velcro™ attachment.

Figure 1:
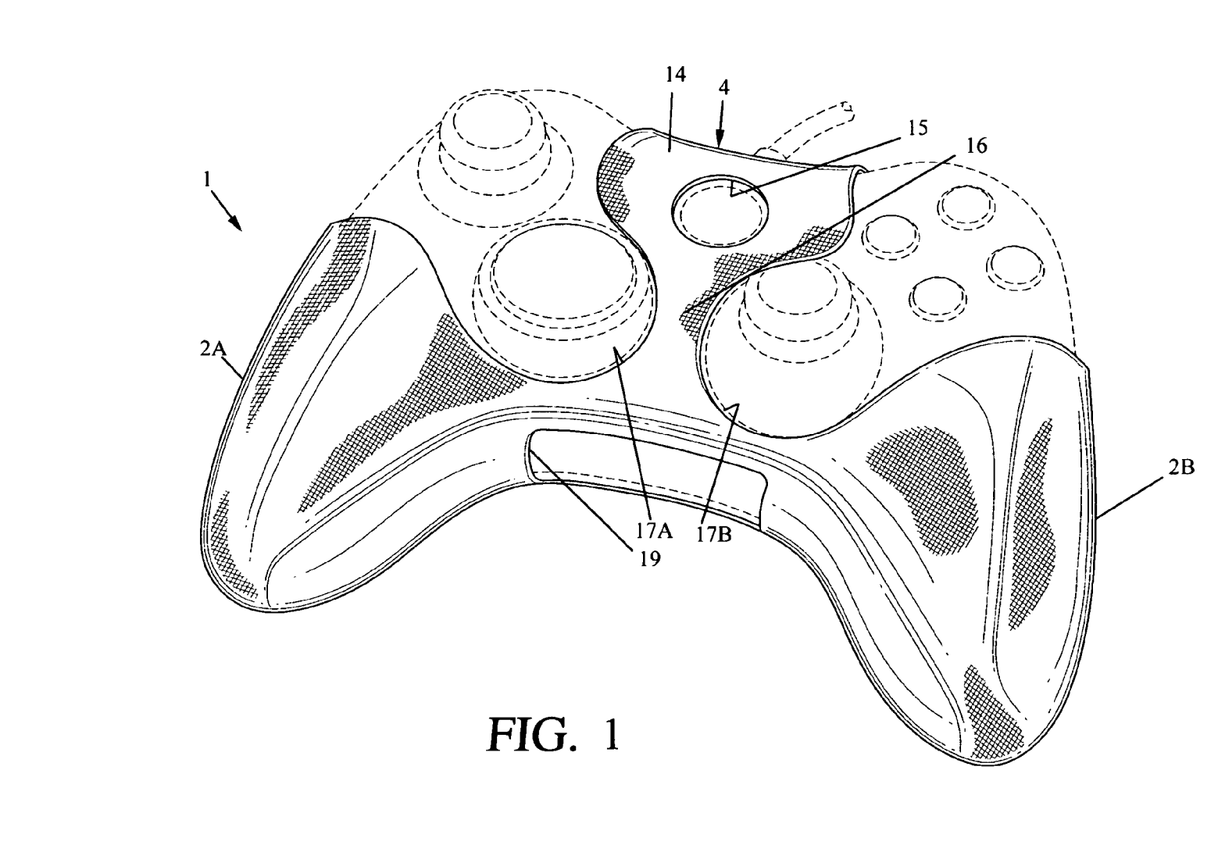
FIG. 1 is a right-side perspective view of a controller cover 1 according to the present invention.
Figure 2:
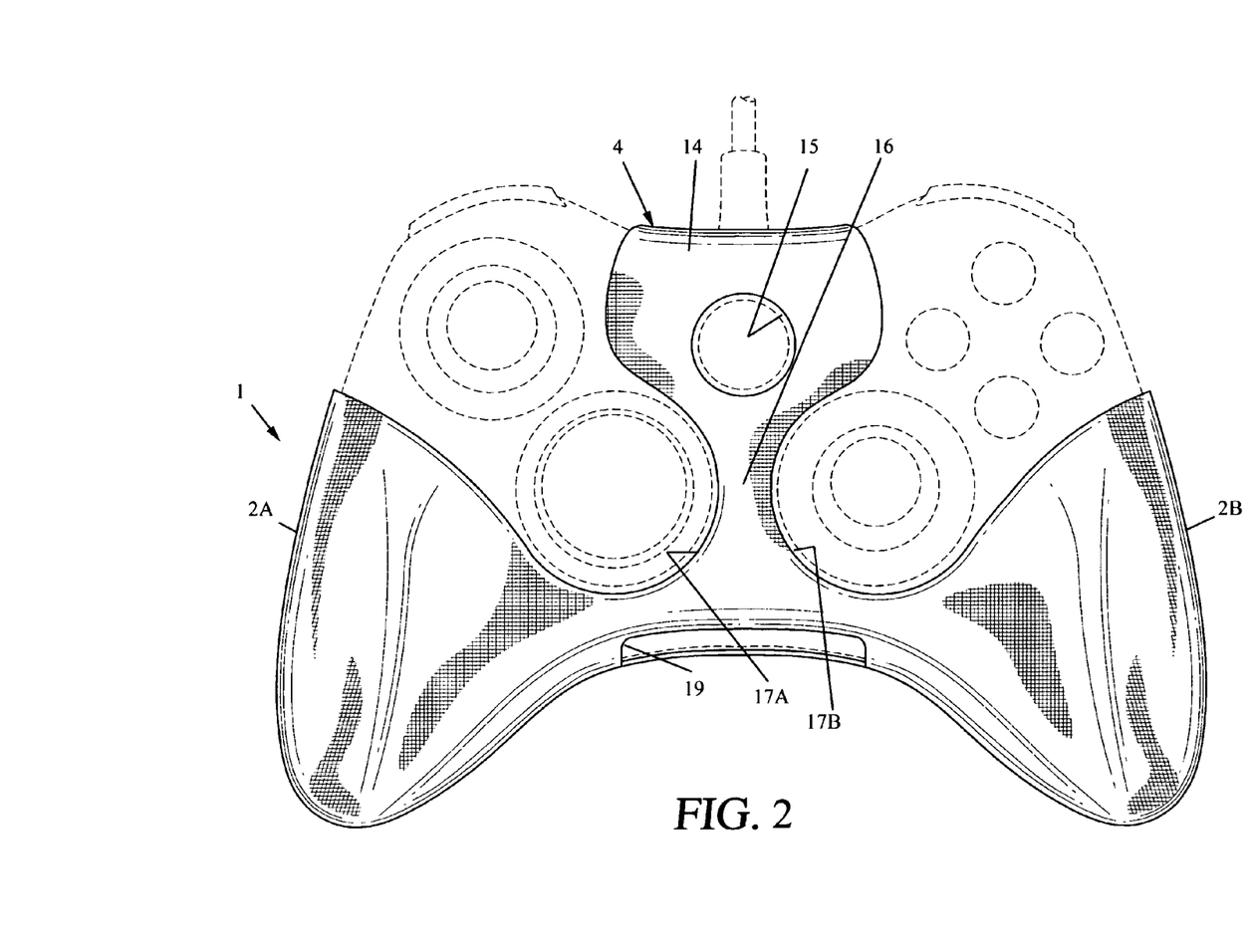
FIG. 2 is a front view of the controller cover 1 as in FIG. 1.
Figure 3:
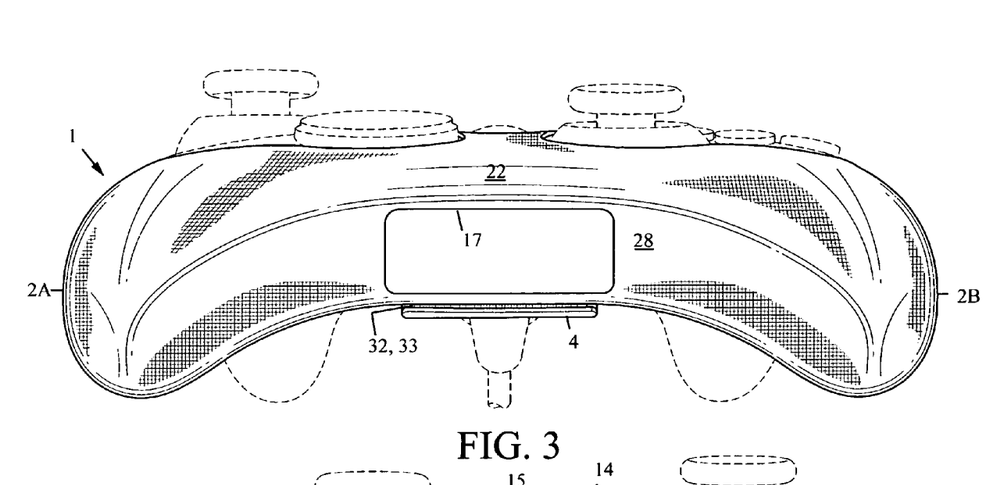
FIG. 3 is a bottom view of the controller cover 1 as in FIGS. 1-2.

FIG. 1 is a right-side perspective view of a controller cover 1 according to the present invention (shown on an Xbox 360™ controller), and FIGS. 2 and 3 are a front view and bottom view, respectively.

With collective reference to FIGS. 1-3, the controller cover 1 generally comprises a two-lobed holster including lobes 2A & 2B contoured to fit the common two-lobed handheld controller configuration of many game controllers (which include a left-hand lobe, right-hand lobe, and central portion, all having an array of face-mounted controls). The twin lobes 2A & 2B are deep enough at the outside to seat approximately half the extent of the controller. At the front, the cut of the twin lobes 2A & 2B arch inward and downward to form opposing apertures 17A & 17B that expose the controller's thumb controls. The arches merge to form a central strap 4 that extends upward between the twin lobes 2A & 2B, wrapping up across the central section of the controller and overtop, where it is affixed to the backside to secure the controller inside the twin lobes 2A & 2B. The controller cover 1 is defined by a substantially rectangular lower aperture 19 that provides access for cable-coupling, when necessary. The central strap 4 begins at a thin section 16 and flares outward above the thumb controls to an enlarged strap section 14 which is defined by a central circular aperture 15 for exposing the controller brand ID plate. It can herein be seen that the controller cover 1 occupies only the most handled section of the controller, namely the bottom half of the opposing lobes, but leaves all functional controls fully exposed.

As best seen in FIG. 3, the controller cover 1 is preferably configured with two fabric panels 22, 28 sewn together peripherally at seams, including a front panel 22 and rear panel 28. The two panels 22-28 are each themselves precut and preformed sections of padded vinyl faux leather, panel 22 including the protruding strap 4. More specifically, each panel 22, 28 comprises a three layer sandwich including a super absorbent padded middle layer sandwiched between an inner fabric liner and an outer porous vinyl textured faux leather fabric. The three layer sandwich of each panel 22, 28 is adhered together and provided in large blanks, which are then precut into the two panels 22, 28 and sewn together at the margins to yield the finished controller 1.

As an alternative to the three-layer fabric, the controller cover fabric may be a two-layer fabric sandwich including an outer soft suede-like material, and an inner vinyl layer having a high coefficient of friction that is designed to stick to the controller plastic. When the inner layer has the property of adhering or sticking to the controller surface it increases the controller cover's skintight effect.

In either case, the Vinyl faux leather outer fabric gives the proper tactile feel, and the padding creates a desirable cushioned feel while also providing sweat absorbency.

Figure 4:
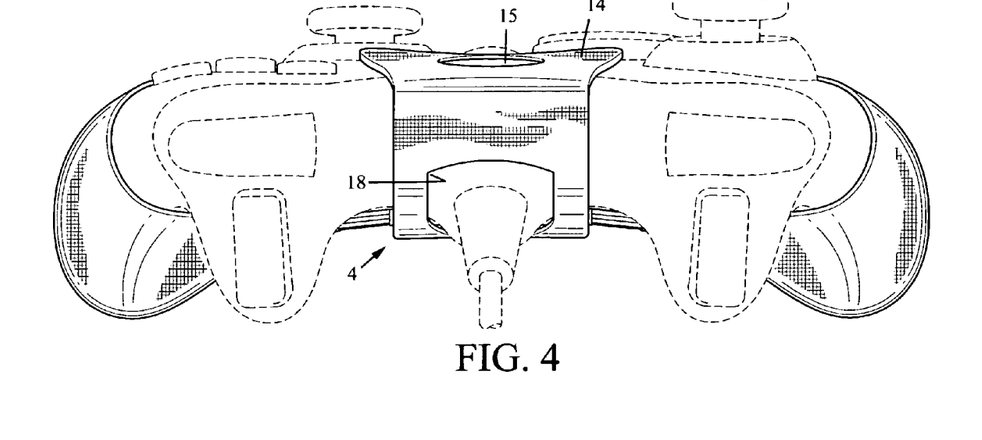
FIG. 4 is a top view of the controller cover 1 as in FIGS. 1-3.

FIG. 4 is a top view of the controller cover 1. As seen in FIGS. 3-4, the controller cover 1 is secured to the controller and is pulled taught by the adjustable center strap 4 which extends outward from the panel 22 and extends around and overtop the central section of the controller.

The strap 4 is contoured and defined by apertures to fit the face and back of the controller. The contours include a thin section 16 that runs between the thumb controllers and then flares out to a thicker fold-over flap 14. The fold-over flap 14 is cut with a circular aperture 15 positioned at the upper front of the controller for exposing the controller brand ID plate, as well as a truncated oval aperture 18 positioned toward the back of the controller to pass the cable of wired-version controllers (strap 4 is attached first then the cable is plugged in).

The strap 4 is secured to the rear of the controller by opposing hook-and-loop (Velcro™) fastening pads 32, 33, one being sewn onto the backside of strap 4 and one to the backside of the panel 28. The Velcro™ attachment allows the user to attach the controller cover 1 by pulling the strap 4 up and around back, pulling taught, and simply pushing the strap 4 against the controller. There are no clips or buckles. Moreover, the Velcro pads 32, 33 are oversize to give a length-adjustable attachment as described below.

One of the most important features of the present controller cover 1 is its ability to adapt in size to different controllers, and in each case ensure a snug tailored fit. This is accomplished by an array of three elastic fabric insets in combination with the Velcro attachment pads 32, 33 described above.

Figure 5:
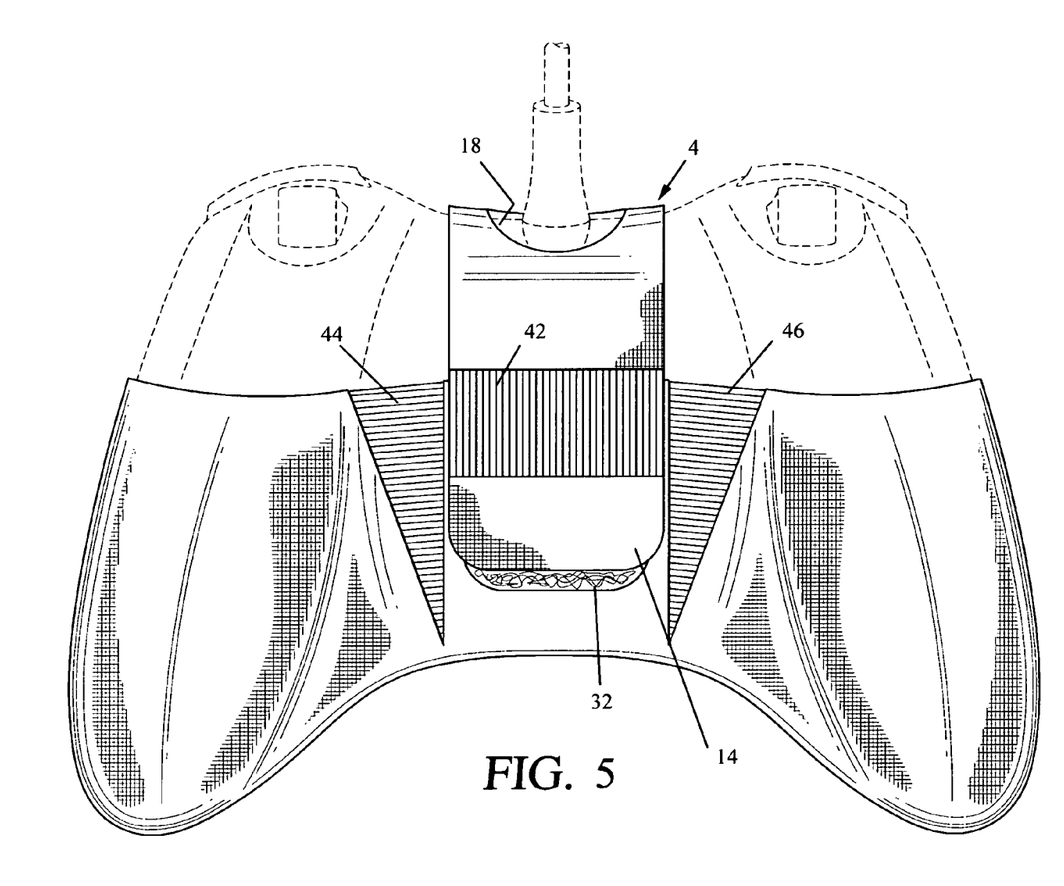
FIG. 5 is a rear view of the controller cover 1 as in FIGS. 1-4.
Figure 6:
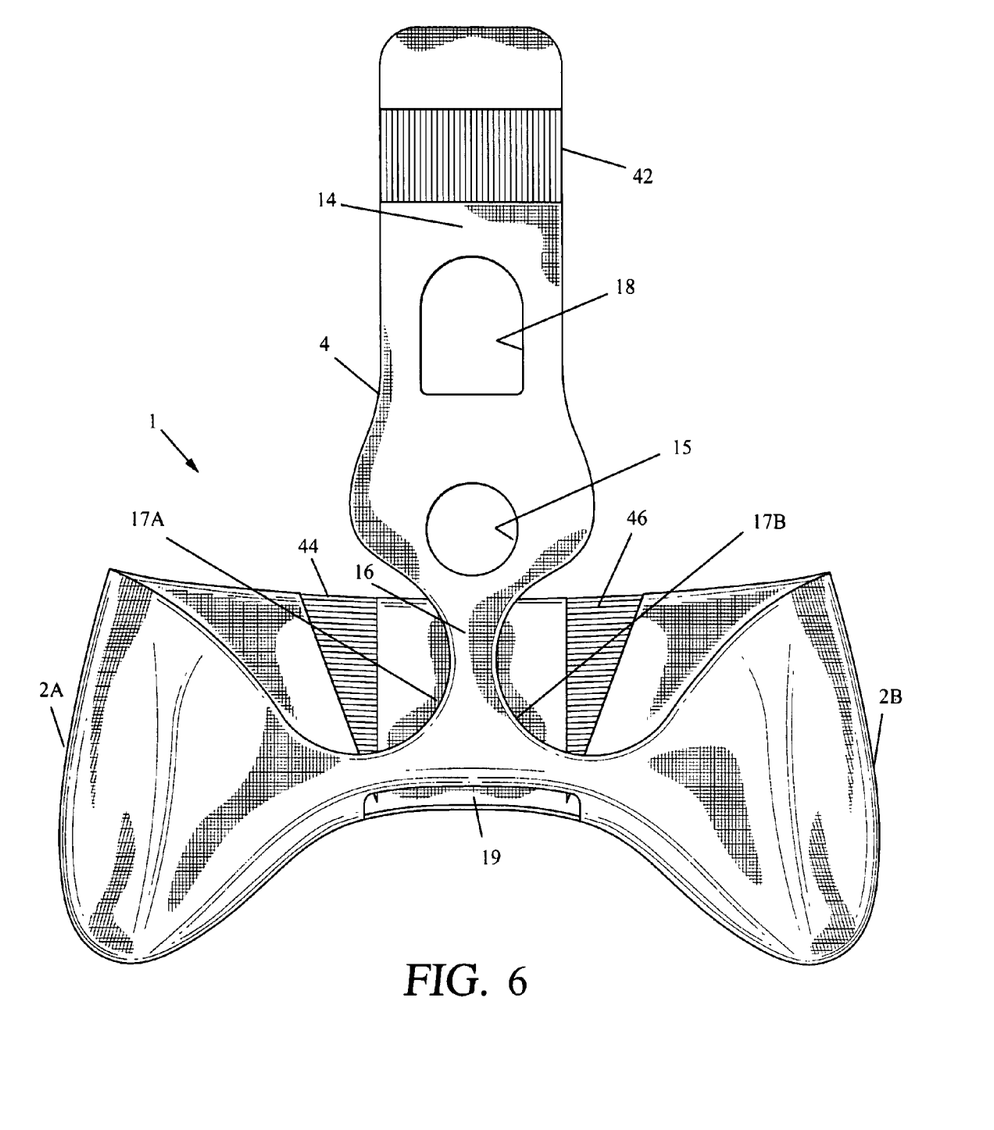
FIG. 6 is a front unfolded view of a controller cover 1 as in FIGS. 1-5.

FIG. 5 is a back view of the controller cover 1 illustrated the array of elastic fabric sections, including a first elastic inset 42 interrupting the strap 4 along its length, such as immediately in advance of the distal Velcro™ pad 32 as shown. The first elastic inset 42 is preferably a rectangular section of width equal to that of the strap 4. During manufacturing, the strap 4 may be cut near the tip and the elastic inset 42 sewn between the cut portions. The elastic inset 42 may be any of a variety of suitable elastic fabrics including Rayon™ or Dacron™. As stated above the use of Velcro™ pads 32, 33 provides a degree of adjustability inasmuch as the pads need not be coupled together in an exact corresponding manner, but rather can be laterally offset by a fair amount in either direction. The elastic inset 42 gives a degree of lengthwise stretch to the strap 4. Thus, the user stretches the strap 4 around the controller and then attaches it, thereby maintaining the cover 1 in a taught form-fitting configuration despite prolonged use. Moreover, the controller cover 1 is much better apt to fit controllers of different sizes. In addition to the lengthwise stretch, a degree of lateral stretch is provided by elastic gussets 44, 46. In the illustrated embodiment each gusset 44, 46 comprises a triangular stretch-fabric section sewn into triangular cutouts in the rear of panel 28, on either side of strap 4. One skilled in the art should understand that it is not necessary that the gussets 44, 46 be triangular, though this shape has the most aesthetic value and minimizes the size of the gussets 44, 46 while still providing the requisite degree of lateral stretch.

The combination of the elastic gussets 44, 46 and adjustable fold-over strap 4 with elastic inset 42 afford a snug tailored fit for precision gaming with Xbox 360™, Nintendo Wii™ and PlayStation 3™ controllers, among others, either cable or wireless versions. Moreover, the three elastic sections 42, 44, 46 combine to provide a fair degree of adaptability to the wide variety of game controllers of varying dimensions.

Figure 7:
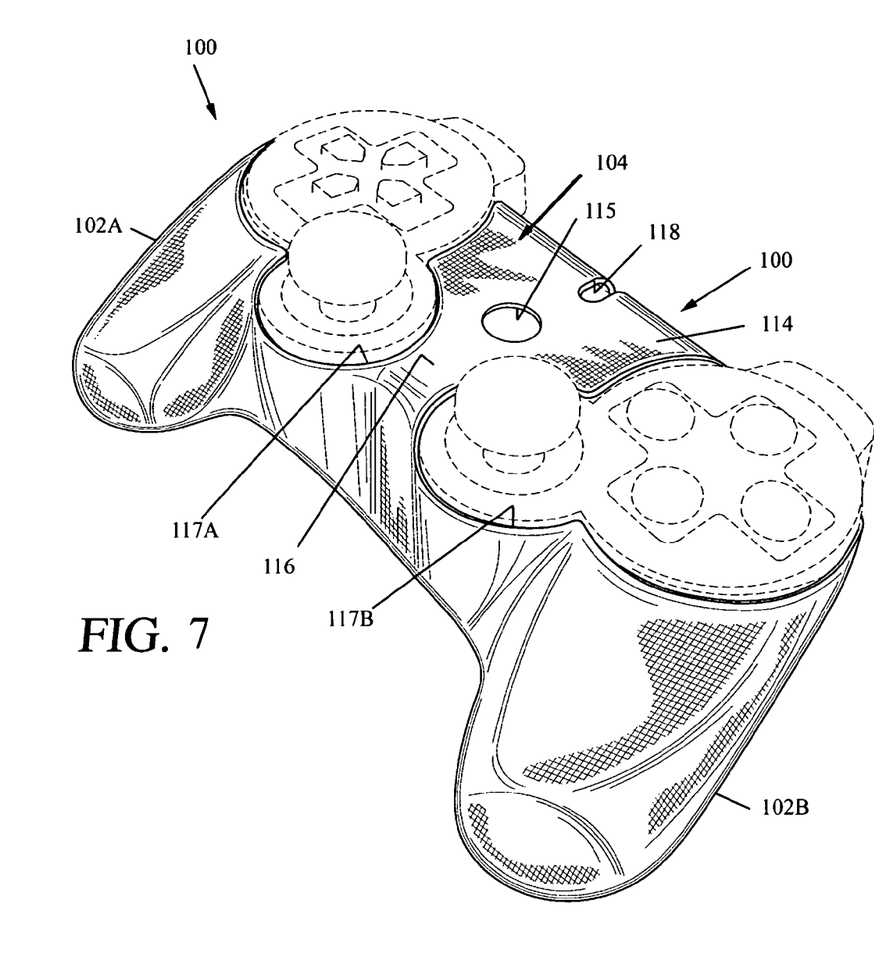
FIG. 7 is a right-side perspective view of a controller cover 100 according to an alternate embodiment of the present invention.

FIG. 7 is a right-side perspective view of a controller cover 100 according to an alternate embodiment of the present invention adapted for a Playstation 3™ controller, which is of slightly different dimensions and has a different control set.

As above, the controller cover 100 generally comprises a two-lobed holster including lobes 102A & 102B contoured to fit the Playstation 3™ two-lobed handheld controller configuration (which likewise includes a left-hand lobe, right-hand lobe, and central portion, with opposing thumb controls and opposing selection buttons). In this embodiment, the twin lobes 102A & 102B are deep enough to substantially seat the entire controller, leaving the face open. The open face is defined by opposing inverted figure-eight apertures 117A & 117B that expose the controller's thumb controls and opposing selection buttons. The figure-eight apertures 117A & 117B flank a central strap 104 that extends upward between the twin lobes 102A & 102B, wrapping up across the central section of the controller and overtop, where it is affixed to the backside to secure the controller inside the twin lobes 102A & 102B. The central strap 104 begins at a thin section 116 and flares outward above the thumb controls to an enlarged strap section 114 which is defined by a central circular aperture 115 for exposing the controller brand ID plate. It can herein be seen that the controller cover 100 occupies substantially the entire backside of the controller, but the opposing inverted figure-eight apertures 117A & 117B leave all functional controls fully exposed.

As described above with regard to FIG. 3, this embodiment may also be formed from two fabric panels including a front panel and rear panel sewn together at seams that run along the sides of the controller. The two panels may likewise be precut and preformed sections of vinyl faux leather (preferably the same two layer grip-fabric or three layer padded sandwich described above), thereby giving the proper tactile feel, and the padding creating a desirable cushioned feel while also providing sweat absorbency.

The controller cover 100 is secured to the controller and is pulled taught by the adjustable center strap 104 which extends outward from the front and extends around and overtop the central section of the controller.

The strap 104 is contoured and defined by apertures to fit the face and back of the controller. The contours include the thin section 116 that runs between the thumb controllers and then flares out to thicker fold-over flap 114. The fold-over flap 114 is cut with a circular aperture 115 positioned at the upper front of the controller for exposing the controller brand ID plate, as well as an oval aperture 118 positioned at the top of the controller to pass the cable of wired-version controllers such as the Playstation 2™ controller (strap 104 is attached first then the cable is plugged in).

Figure 8:
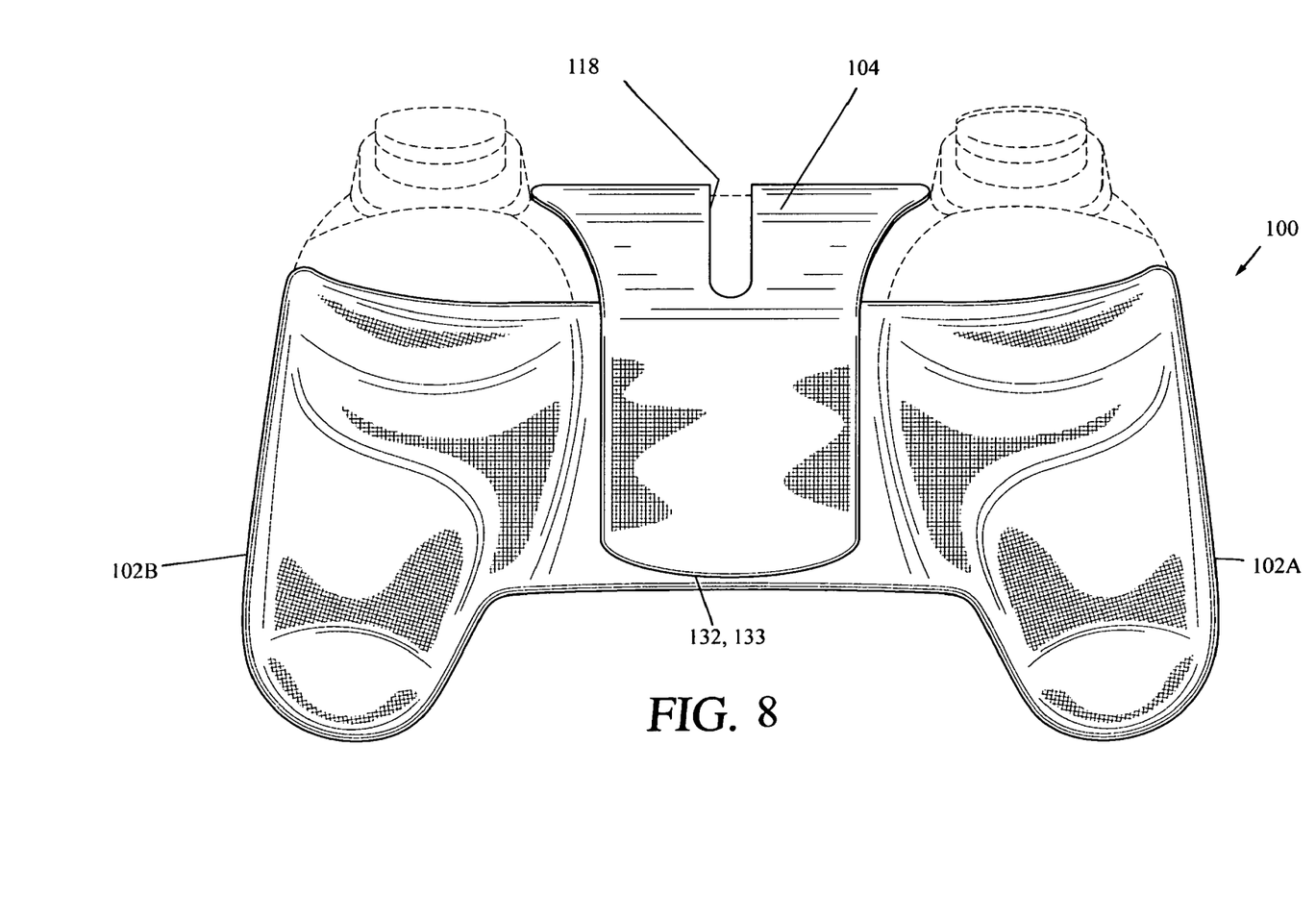
FIG. 8 is a rear view of the controller cover 100 as in FIG. 7.
Figure 9:
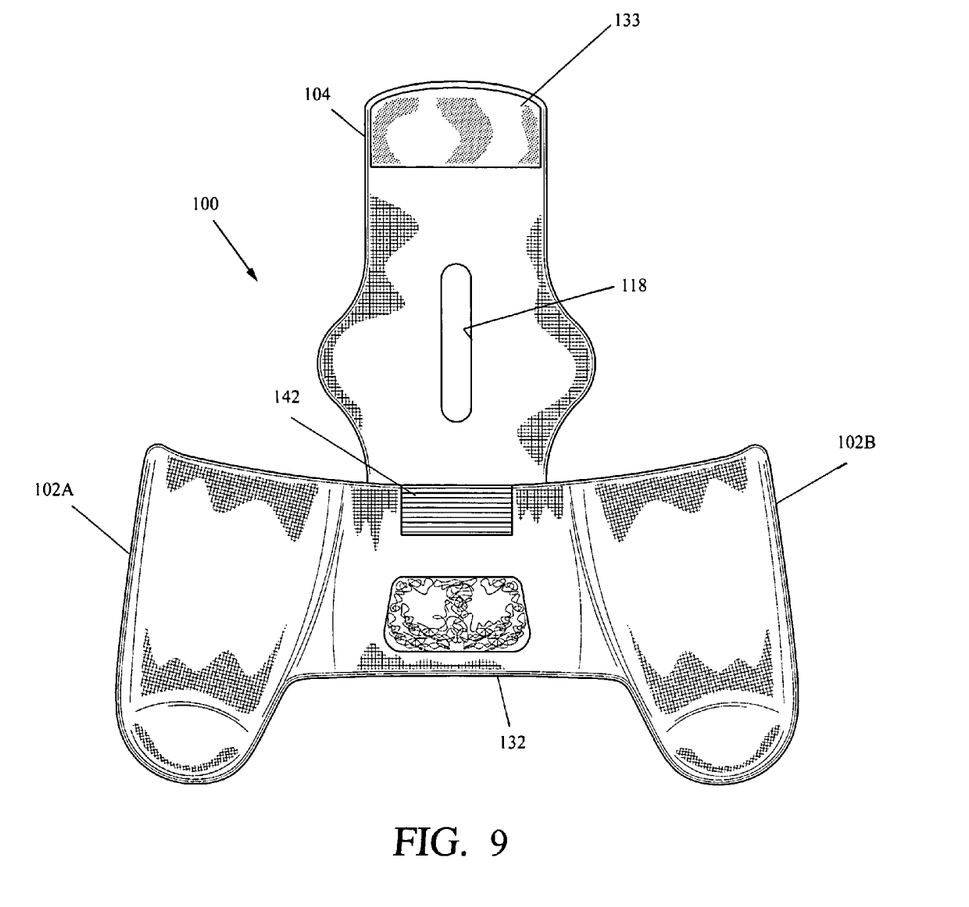
FIG. 9 is a front unfolded view of a controller cover 100 as in FIGS. 7-8.

FIG. 8 is a rear view of the controller cover 100 as in FIG. 7. The strap 104 is secured to the rear of the controller by opposing hook-and-loop (Velcro™) fastening pads 132, 133, one being sewn onto the backside of strap 104 and one to the backside of the controller cover. The Velcro™ attachment allows the user to attach the controller cover 100 by pulling the strap 104 up and around back, pulling taught, and simply pushing the strap 104 against the controller. There are no clips or buckles. Moreover, the Velcro pads 132, 133 are oversize for the length-adjustable attachment described above.

In order to adapt in size to different controllers and in each case ensure a snug tailored fit, an elastic inset 142 is provided. The first elastic inset 142 is preferably a rectangular section of stretch-fabric of width equal to that of the strap 104. The elastic inset 142 may be any of a variety of suitable elastic fabrics including Rayon™ or Dacron™. Inset 142 is sewn into the rear of the cover 100 as shown, above Velcro™ pads 132, 133. Again the stretch fabric inset 142 affords a snug tailored fit for precision gaming with the Playstation 3™ and Playstation 2™ controllers, among others.

Velcro™ pads 132, 133 provide a degree of adjustability, while elastic inset 142 gives a degree of stretch to the cover 100. Thus, the user stretches the strap 104 around the controller and then attaches it, thereby maintaining the cover 100 in a taught form-fitting configuration despite prolonged use. Moreover, the controller cover 100 is much better apt to fit controllers of different sizes.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A cover for a video game controller having a left-hand lobe, right-hand lobe, and central portion with opposing thumb controls, comprising:

a holster formed of three overlying layers including a vinyl faux leather exterior layer, a padded middle layer and an inner vinyl gripping layer, said holster being defined by opposing lobes for seating said left-hand and right-hand lobes of said controller;

a central strap formed integrally with said holster and extending upward between the opposing lobes thereof, wrapping up across the central section of the controller and overtop;

opposing hook and loop fastening pads, one mounted on the distal backside of said strap and one on the backside of the holster for securing said strap around said controller;

a stretch fabric inset fully interrupting said strap to impart a degree of lengthwise resiliency;

a pair of gussets interrupting the backside of said holster, each said gusset comprising a triangular stretch-fabric section sewn into a triangular cutout in the rear of the controller cover between said central strap and said lobes;

whereby said controller cover is affixed to said controller in a taut form-fitting configuration by seating the controller in the holster and pulling the strap up and around back, pulling taut, and pushing the strap against the controller.

2. The controller cover according to claim 1, wherein said three overlying holster layers further comprise a three layer fabric sandwich including a super absorbent padded middle layer sandwiched between an inner vinyl fabric liner and an outer porous vinyl textured faux leather fabric.

3. The controller cover according to claim 1, wherein said opposing lobes are frontally defined by opposing apertures arching inward to expose the controller's thumb controls.

4. The controller cover according to claim 1, wherein said central strap is attached at a thin section and flares outward to an enlarged distal end.

5. The controller cover according to claim 1, wherein said fold-over flap is cut with a circular aperture for exposing the controller brand ID plate.

6. The controller cover according to claim 5, wherein said fold-over flap is cut with a truncated oval aperture to pass the cable of said controller.

7. The controller cover according to claim 1, comprising a rectangular lower aperture for providing access for cable-coupling.

8. A cover for a video game controller having a left-hand lobe, right-hand lobe, and central portion with opposing thumb controls, comprising:
- a holster defined by opposing lobes for seating said left-hand and right-hand lobes of said controller;
- a central strap formed integrally with said holster and attached between the opposing lobes thereof for attachment over the central section of the controller;
- a stretch fabric inset fully interrupting said strap to impart a degree of lengthwise resiliency;
- opposing hook and loop fastening pads, one mounted on the distal backside of said strap and one on the backside of the holster for securing said strap around said controller;
- a pair of gussets interrupting the backside of said holster, each said gusset comprising a triangular stretch-fabric section sewn into a triangular cutout in the rear of the controller cover between said central strap and said lobes;
- whereby said controller cover is affixed to said controller in a taut form-fitting configuration by seating the controller in the holster and pulling the strap up and around back, pulling taut, and pushing the strap against the controller.

9. The controller cover according to claim 8, formed substantially of a three layer fabric sandwich including a super absorbent padded middle layer sandwiched between an inner fabric liner and an outer porous vinyl textured faux leather fabric.

10. The controller cover according to claim 8, formed substantially of a two layer fabric sandwich including an outer soft suede-like fabric and an inner vinyl gripping layer.

11. The controller cover according to claim 8, wherein said opposing lobes arc frontally defined by opposing apertures arching inward to expose the controller's thumb controls.

12. The controller cover according to claim 11, wherein said opposing apertures are defined by inverted figure eights.

13. The controller cover according to claim 12, wherein said central strap is attached at a thin section between said apertures and flares outward to an enlarged distal end.

14. The controller cover according to claim 8, wherein said fold-over flap is cut with an aperture to pass the cable of said controller.

15. The controller cover according to claim 8, comprising a rectangular lower aperture for providing access for cable-coupling.

16. A cover for a video game controller having a left-hand lobe, right-hand lobe, and central portion with opposing thumb controls, comprising:
- a holster formed of a plurality of layers of material including an inner vinyl gripping layer, said holster being defined by opposing lobes for seating said left-hand and right-hand lobes of said controller;
- a central strap formed integrally with said holster and extending upward between the opposing lobes thereof, wrapping up across the central section of the controller cover and overtop;
- opposing hook and loop fastening pads, one mounted on the distal backside of said strap and one on the backside of the holster for securing said strap around said controller;
- a pair of stretch-fabric gussets interrupting the backside of said holster, each said gusset sewn into a cutout in the rear of the controller between said central strap and said lobes;
- whereby said controller cover is affixed to said controller in a taut form-fitting configuration by seating the controller in the holster and pulling the strap up and around back, pulling taut, and pushing the strap against the controller.

* * * * *